Jan. 22, 1924.

J. R. BEARD 1,481,585

ELECTRIC REACTIVE WINDING

Filed Sept. 16, 1919  4 Sheets-Sheet 1

Inventor
James Robert Beard
by Foster, Freeman, Watson & Coit
attorneys

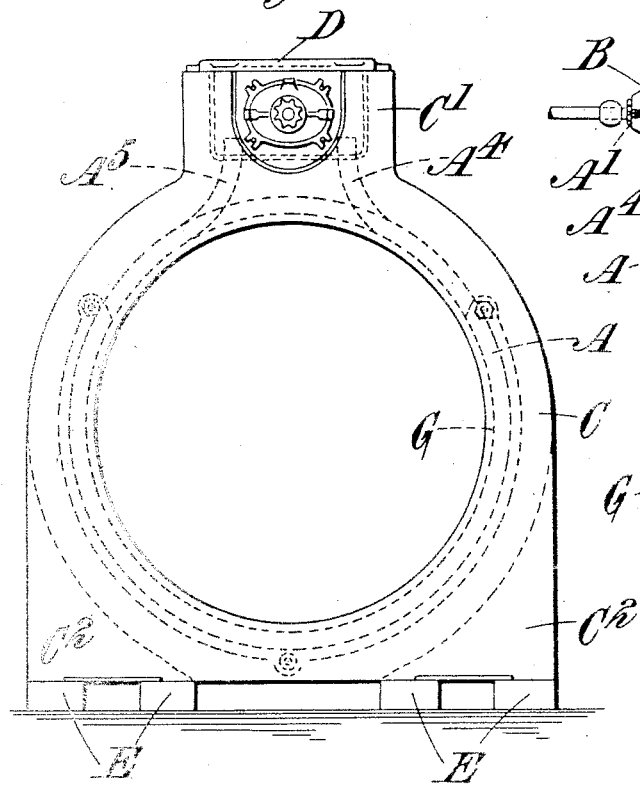
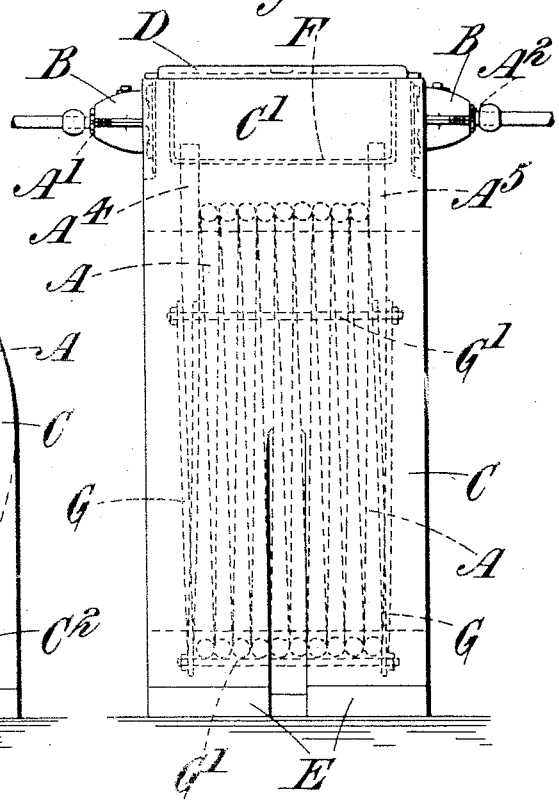
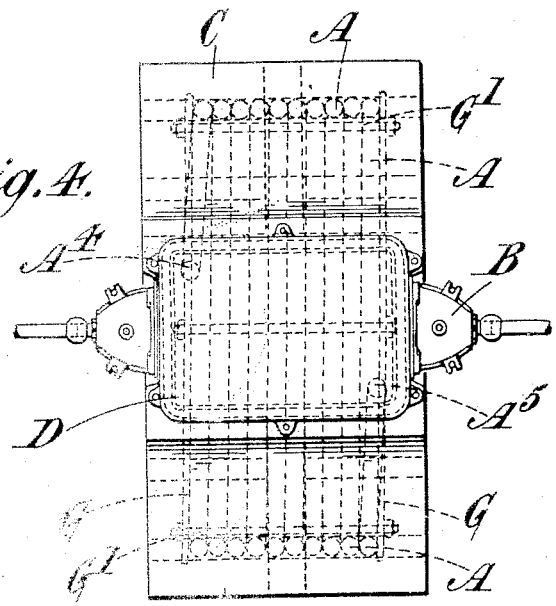

Jan. 22, 1924.                                          1,481,585
J. R. BEARD
ELECTRIC REACTIVE WINDING
Filed Sept. 16, 1919         4 Sheets-Sheet 4

Inventor
James Robert Beard
by Foster, Freeman, Watson & Cort
Attorneys

Patented Jan. 22, 1924.

1,481,585

UNITED STATES PATENT OFFICE.

JAMES ROBERT BEARD, OF BENTON, ENGLAND, ASSIGNOR TO ELECTRICAL IMPROVEMENTS LIMITED, OF NEWCASTLE-UPON-TYNE, ENGLAND.

ELECTRIC REACTIVE WINDING.

Application filed September 16, 1919. Serial No. 324,248.

*To all whom it may concern:*

Be it known that I, JAMES ROBERT BEARD, a subject of the King of England, and resident of Benton, Northumberland, England, have invented certain new and useful Improvements in Electric Reactive Windings, of which the following is a specification.

This invention relates to electric reactive windings for instance to reactance coils and transformers its object being the construction of such apparatus particularly suitable for use in large alternating current high voltage electrical distribution systems.

Reactances for such purposes are sometimes constructed in the form of coils of bare conductor suitably supported the separate turns being lightly insulated from each other by such material as concrete or porcelain and insulated from earth by suitably placed insulating supports. In some instances the bare conductors have been wound on racks or frames so as to be capable of resisting heavy stresses.

A reactive winding according to the present invention, comprises an insulated cable with an outer metallic sheath, coiled in helical form the turns of the coil being supported so as to withstand the strains due to heavy currents.

Preferably the cable is of the type commonly used for high voltage distribution, the core being insulated with impregnated paper or varnished fabric and the cable lead sheathed. This cable is coiled into a helical form and the turns forming the coil may be mechanically supported by embedding them in concrete or other suitable material or by supporting them in properly spaced racks. A reactive winding constructed in this manner is particularly suitable for high voltages as the method of insulation is one of the most perfect methods which are available whilst the lead sheath which completely surrounds the conductor or conductors carrying the current can be solidly earthed and thus renders the reactive winding perfectly safe to handle under all conditions.

Conveniently the lead sheathed cable may contain two or more conductors or cores each core being comparatively lightly insulated from the adjacent core or cores but the whole of the cores being insulated from the sheath to withstand the normal voltage to earth. The sheathed cable is coiled in the form of a cylindrical helix, its cores thus each forming one of a number of similar coils, the adjacent turns of these coils being lightly insulated from each other but fully insulated from earth. Suitable cross connections are arranged between the cores at the two ends of the cable forming the reactive winding so that the connections of the cores can be varied. For instance all the coils can be electrically connected in series to form a reactive winding which is electrically approximately equivalent to one wound with a single core cable and having a total number of turns equal to the number of turns of the multi-core cable multiplied by the number of the cores contained in it.

When the reactive winding forms part of a transformer either one or both of the windings may consist of an insulated sheathed cable, or if desired both primary and secondary windings of the transformer may be contained in the one sheathed cable.

To prevent or reduce the voltage which, in certain circumstances, might be induced between the two ends of the sheath, the continuity of the sheath may be broken at one or more points and the mid or other convenient points of the sections of the sheath thus separated may be connected together or joined to earth. Thus for example supposing the induced voltage between the ends of the continuous sheath to be 500 if the sheath is divided into five sections the maximum voltage induced in each section would be 100 and if the mid point of each section of sheath is connected to earth the maximum voltage between each section and earth would be reduced to 50.

Proper precautions are taken to ensure that the points of the cable where the continuity of the sheath is broken are covered or protected.

Where there is a considerable voltage between the terminals it usually follows that there is a corresponding appreciable voltage between consecutive turns of the winding, and therefore according to this invention when a multi-core cable is employed as the reactive winding the separate cores are preferably arranged and connected so that the cores having comparatively large voltages between them are not adjacent in the cable. In the accompanying drawings, Figures 1 to 5 illustrate by way of example one construction of a reactive winding according to this invention in the form of a reactance coil.

Figure 2 is an end elevation.

Figure 3 is a side elevation.

Figure 4 a plan showing the practical construction of the apparatus and

Figure 5:
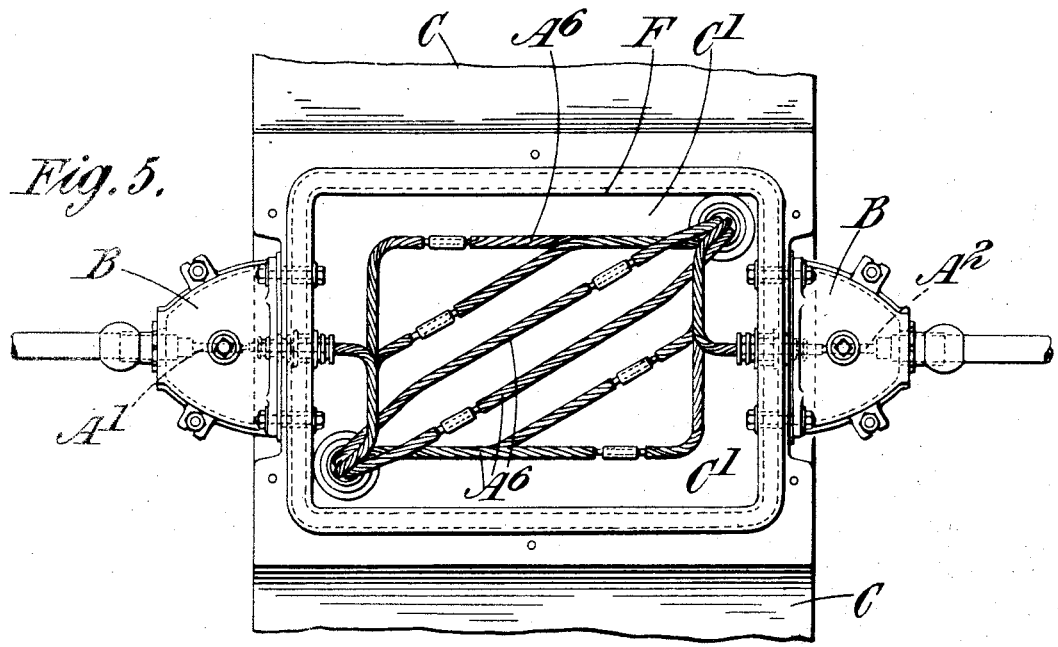

Figure 5 is a plan of a portion of the top part of the apparatus drawn to a larger scale and with a part removed.

Figure 6:
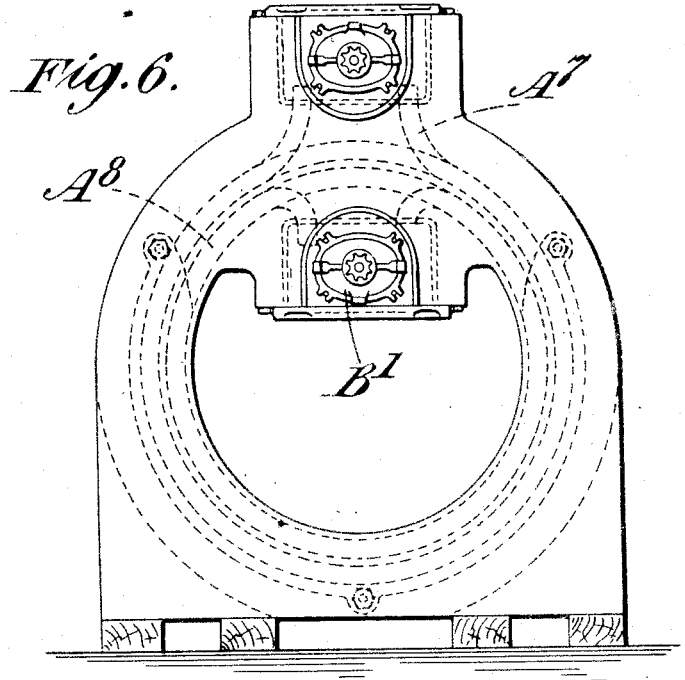

Figure 6 shows a reactive winding accordding to this invention in the form of a transformer, the figure being an end view somewhat similar to Figure 2.

Figure 7:
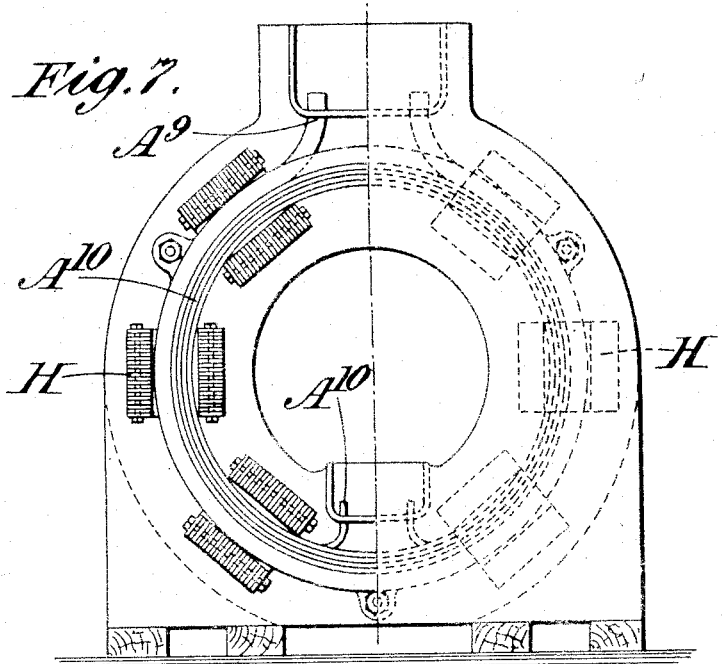

Figure 7 is an end view partly in section showing another construction of transformer according to this invention.

Figure 8:
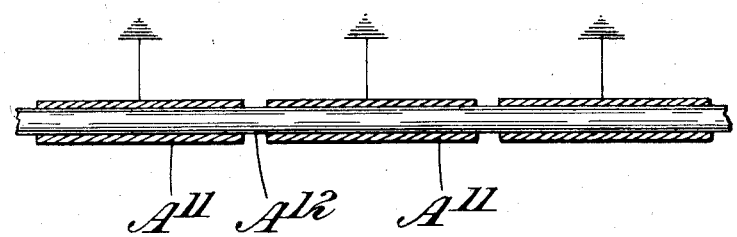

Figure 8 is a diagram illustrating the division of the metallic sheath into separate sections.

Figure 9:
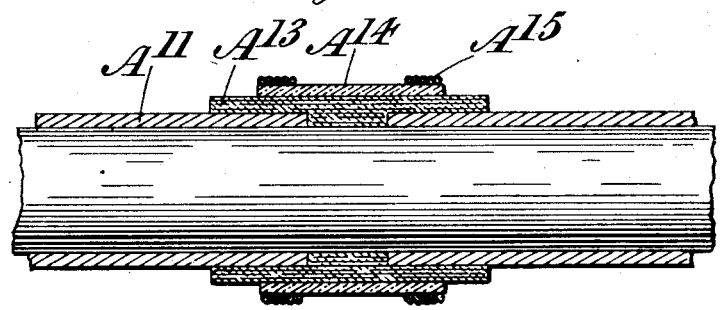
Figures 10, 11:
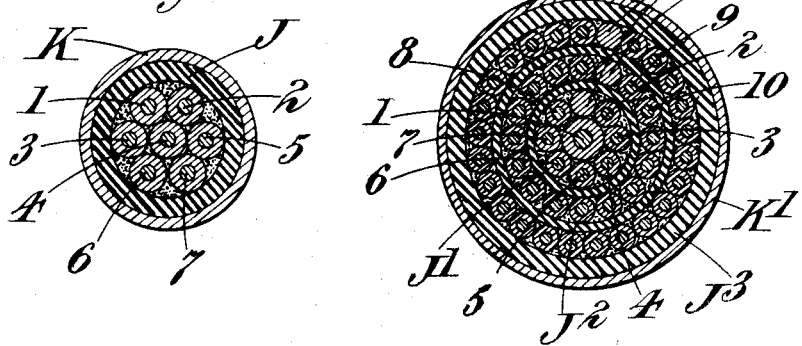

Figure 9 is a diagrammatic section drawn to a larger scale showing a method of protecting the cable at the places where the sheath is divided and Figures 10 and 11 are sections illustrating suitable constructions of sheathed cables, and by way of example, methods of joining up the cores for use in reactive windings according to this invention.

Figure 1:
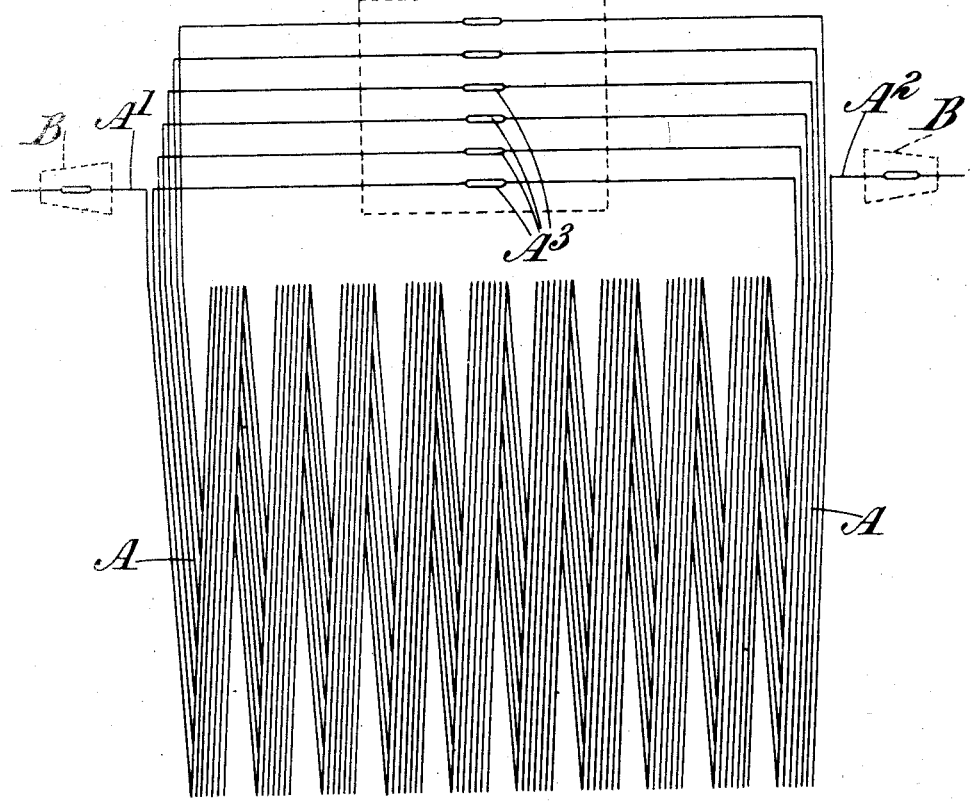
Figure 1 is purely diagrammatic and shows an arrangement of a multi-core cable having its cores connected in series to form the reactance.

With reference first to the diagram forming Figure 1, A represents a multi-core cable comprising seven conducting cores and coiled in helical form to constitute a reactance. The conductors forming the cable are joined in series to give in effect a reactance coil of seventy turns, there being ten turns of the cable as a whole. The extreme ends $A'$ $A^2$ of the conductor are represented as passing out through terminal boxes B. The joints between the several conductors are indicated at $A^3$ and are enclosed by a joint box represented in Figure 1 merely by the dotted line $C'$.

Figures 2, 3, 4 and 5 show one practical construction of a reactance coil corresponding to the diagram forming Figure 1. In these figures the sheathed cable A is wound into a close inductive coil the incoming and outgoing ends of which are represented at $A^4$ and $A^5$. Portions of the separate and comparatively lightly insulated conducting cores $A^6$, are shown in Figure 5 and the ends $A'$ and $A^2$ are led out through the terminal boxes B which are filled with some insulating material.

The inductive coil formed by the turns of the cable A is supported and made strong to withstand the stresses due to heavy currents by embedding or moulding it in concrete or other suitable material. This material is in the form of a cylinder C having an upper hollow chamber $C'$ forming a joint box for the cross connections between the conducting cores of the cable. This box is closed by a cover D and in Figure 5 the box is shown in plan on an enlarged scale with the cover removed. The concrete cylinder C is formed with feet or base portions $C^2$ which rest upon wooden sleepers E.

The box or chamber $C'$ is preferably lined with lead as at F and to this lining the lead sheathing of the cable is connected so as to form an efficient earth.

A frame comprising segmental ring plates G and bolts $G'$ holds and supports the coiled cable before the concrete is moulded round it and as this frame is also embedded with the cable in the concrete it forms an additional source of strength for the completed structure. The plates G are preferably segmental or are not made as complete rings to avoid inductive effects being set up in them.

It will be understood that the conductors $A^6$ may be cross connected in the box $C'$ to form for example an arrangement corresponding electrically to that shown in the diagram forming Figure 1, or alternatively other methods of connection may be employed.

Although it is convenient to embed or mould the turns of the cable in concrete or like material to give the apparatus the necessary strength to withstand the stresses due to heavy currents, this need not necessarily be done and other methods for securing the same end may be adopted. For instance, the turns of the cable may be held in strong racks or frames which may, for example, be modified and stronger forms of the clamping frames G $G'$.

Figure 6 is an end view generally similar to Figure 2 but showing diagrammatically two reactive windings constituting a transformer one winding being formed by a sheathed cable $A^7$ which may be regarded as equivalent to the cable A of Figures 1 to 5 and the other by a similar cable $A^8$. The ends of this cable $A^8$ may be brought out at boxes $B'$ one of which is shown in Figure 6.

In Figure 7 one of the windings of the transformer consists of a sheathed cable $A^9$ similar to the cables A and $A^8$ but the other winding consists for example of a conducting strip $A^{10}$. This figure also shows the provision of laminated cores H through which the windings pass.

Figure 8 shows diagrammatically how the sheath $A^{11}$ of a cable $A^{12}$ may be divided into separate sections each section being earthed.

At each place where the sheath is divided the cable may be protected mechanically and electrically by a sleeve of insulation as for instance a tape wrapping at $A^{13}$ (Figure 9). This sleeve is in its turn protected by a lead sleeve $A^{14}$ and binding wire $A^{15}$.

Figure 10 is a cross section of a cable having seven comparatively lightly insulated cores, all the cores being surrounded by comparatively heavy insulation J which is covered by the lead sheath K. By reference to the figure it will be seen that there is a central core surrounded by six other cores equally spaced and in order that cores having comparatively high voltages between them shall not be adjacent in the cable one core of the outside six may be connected as No. 1, the next as No. 2, the next as No. 5, the next as No. 7, the next as No. 6, the next or last in the circle and consequently adjacent to No. 1 as No. 3 and the central core as No. 4. These numbers are indicated in the figures against the particular cores.

Figure 11 shows in cross section another multi-core cable comprising a central core surrounded by seven other cores all separately insulated and surrounded as a whole by a layer of insulation J'. Outside the insulating layer J' is another concentric circle of insulated cores surrounded by insulation J², outside this again a further concentric circle of insulated cores, then a thick layer of insulation J³ and the outer metallic sheath K'. In such a construction of cable the central core may be connected as No. 1 and the cores forming the first circle connected in rotation as Nos. 2, 3, 4, 5, 6, 7 and 8. The core bearing the lowest number in the second circle, that is No. 9, is adjacent to No. 2 in the first circle and so on. In such an arrangement as a further precaution, one of the cores L in each circle namely that core which separates the cores with the greatest difference of voltage may be a dummy or insulating core. The insulation of the central core may with advantage be somewhat thicker than that of the other cores.

The arrangement also readily lends itself to the addition of extra insulation on the turns adjacent to the main terminals to afford protection against surge effects which may enter the winding from outside.

These two methods of joining up the cores are merely given by way of example as indicating methods in which comparatively large differences of voltage between adjacent cores may be avoided and economy effected by obtaining the required factor of safety in the insulation between the turns of the reactive winding with the least amount of insulating material.

What I claim as my invention and desire to secure by Letters Patent is:—

1. In a reactive winding the combination of an insulated cable coiled in helical form, such cable having a plurality of cores comparatively lightly insulated from each other the cores as a whole being surrounded by insulation sufficient to withstand the normal voltage to earth, connections between the cores joining them in series, an outer metallic sheath, and means for supporting the turns of such metallic sheathed cable to withstand the stresses due to heavy currents.

2. A reactive winding comprising an insulated cable with an outer metallic sheath, said cable being coiled in helical form, means for supporting the turns of said cable to withstand the stresses due to heavy currents and means for connecting the metallic sheath to earth.

3. In a reactive winding the combination of an insulated cable coiled in helical form, an outer metallic sheath to said cable said sheath being divided into separate sections in the length of the coiled cable, means for supporting the turns of the sheathed cable to withstand the stresses due to heavy currents, and means for connecting to earth the separate sections of the sheath.

4. In a reactive winding the combination of an insulated cable coiled in helical form, an outer metallic sheath to said cable said sheath being divided into separate sections in the length of the coiled cable, means for supporting the turns of the sheathed cable to withstand the stresses due to heavy currents, means for connecting to earth the separate sections of the sheath and means for protecting the cable at the places where the sheath is divided.

5. A reactive winding comprising an insulated cable with an outer metallic sheath, said cable being coiled in helical form and embedded in a non-magnetic supporting mass so that the turns of the cable can withstand the stresses due to heavy currents.

6. In a reactive winding the combination of an insulated cable coiled in helical form such cable having a plurality of cores comparatively lightly insulated from each other the cores as a whole being surrounded by insulation sufficient to withstand the normal voltage to earth, connections between the cores joining them in series said connections being such that cores having comparatively large voltages between them are not adjacent in the cable, an outer metallic sheath forming an outer layer of the cable and means for supporting the turns of such metallic sheathed cable to withstand the stresses due to heavy currents.

In testimony whereof I have signed my name to this specification.

JAMES ROBERT BEARD.